UNITED STATES PATENT OFFICE.

ALFRED B. ELY, (TRUSTEE,) OF NEWTON, MASSACHUSETTS, ASSIGNEE OF L. R. STREETER.

IMPROVEMENT IN PLATES FOR ARTIFICIAL TEETH.

Specification forming part of Letters Patent No. 72,428, dated December 17, 1867; Reissue No. 2,968, dated June 9, 1868.

*To all whom it may concern:*

Be it known that LEANDER R. STREETER, of Chelsea, in the State of Massachusetts, has invented or discovered a new and useful Compound or Compounds or Preparations for Artificial Gums, or Plates or Bases for Artificial Teeth, and other purposes, as well as a mode or process for manufacturing artificial gums or plates for teeth, &c.; and the following is a full and exact description of the same.

The object of this invention is to furnish artificial gums, or plates or bases for teeth, &c., which afford the requisite qualities of strength and toughness, without some of the objections to vulcanized rubber and to metallic plates.

It consists in combining hard resins and resinous substances, such as amber, copal, lac, or any analogous matter, with fibrous or textile materials, in crude or prepared (mechanical or chemical) condition, and the reduction of the same to the desired forms by means of heat and pressure.

Where fibrous materials are used in any natural or manufactured form, cotton, wool, &c., they may be ground up with the resinous substance, or they may be thoroughly imbued with it by the aid of a volatile solvent, or they may be directly melted in, which may be required where textile materials are used. The fiber may be chemically prepared, so as to be soluble in any proper volatile solvent, and to this the resinous substance or substances, in solution or otherwise, may be added in any proper proportion for the purpose desired. The compound will be in better form for use if rolled or pressed into moderately thin sheets.

The casts may be taken in the same manner as is now in common use for the vulcanized-rubber process. The female mold, being coated with a solution of gum-arabic, with a little glycerine, or other suitable substance, and then heated to nearly the degree of boiling water, is to be packed with the prepared compound or material. The work may be facilitated by the use of a little alcohol or other suitable solvent, and a moderately-hot metallic instrument may be found useful. Experience will soon enable the operator to perform the work of packing with facility, and to proportion the proper quantities required.

When ground together, about two parts of resinous substance to one of fiber will ordinarily answer. When textile materials are used, they may be shredded up and ground in. When the fiber has been prepared and treated with a volatile solvent, the compound, when to be used, had better be made more or less plastic, either in or out of the mold, by the use of alcohol or other solvent. After the packing is finished, the male mold, properly heated and coated, is put in place and forced down to bring the packing into perfect shape. The flask is now heated more or less, according to the ingredients used—say in some cases from 200° to 250°—and then allowed to cool slowly.

Coloring matter can be used as may be found desirable. Where fibrous or textile matter is used, not in solution, the color may be imparted to or found in the fiber. Care must be taken not to carry the heat too high, to avoid decomposition, nor too low, to avoid lack of toughness and tensity.

In this manner an article is produced of exceeding lightness, pleasantly flexible, inodorous, and tasteless. It will not be liable to break by falls, and is innocuous. It also allows of alteration in shape and of repairs, and will resist all chemical action in the mouth.

Such other materials may be combined with the fibrous or textile and resinous matters as may be required, to perfect the rigidity, tenacity, strength, and indestructibility of the whole, and any mode of preparing the materials may be used for the same purpose.

In order to give increased strength to the plate or base in certain cases and kinds of work, a thin plate of metal, horn, shell, gutta-percha, or any suitable material may be used between or with layers of the above compounds, and formed into the required shape for use. This plate may be made of wood, or even prepared paper, or any material thin and tenacious which can be struck or pressed into suitable form, the object being to use a thin plate or veneer of any suitable material which may be cheap and durable, and then to coat it with or place it between layers of the resinous and fibrous compounds where more strength is wanted, and in some cases where more bulk may be allowed in the article when made.

What is claimed for plates and bases for artificial teeth and other purposes is—

1. The use of hard resins or resinous bodies, mixed with fibrous or textile materials, and shaped by means of heat and pressure, substantially as described.

2. The use of thin plates of metal, horn, shell, gutta-percha, wood, or such other suitable material capable of being properly shaped between or in combination with layers of the resinous and fibrous compounds, as and for the purposes substantially as described.

3. As a base for artificial teeth or gums, &c., the use of fiber or fibrous material chemically or mechanically treated or prepared, and saturated or mixed with lac or other suitable substances, which, when heated and pressed or pressed and heated, will assume the proper shape and possess or acquire the proper hardness and elasticity, substantially as described.

ALFRED B. ELY, *Trustee.*

Witnesses:
H. L. JONES,
HENRY T. MUNSON.